US008514651B2

(12) United States Patent
Levy et al.

(10) Patent No.: US 8,514,651 B2
(45) Date of Patent: Aug. 20, 2013

(54) SHARING ACCESS TO A MEMORY AMONG CLIENTS

(75) Inventors: Gil Levy, Hod Hasharon (IL); Nafea Bshara, San Jose, CA (US); Yaron Zimerman, Kiryat Ono (IL); Carmi Arad, Nofit (IL)

(73) Assignees: Marvell World Trade Ltd., St. Michael (BB); Marvell Israel (M.I.S.L) Ltd., Yokneam (IL)

( * ) Notice: Subject to any disclaimer, the term of this patent is extended or adjusted under 35 U.S.C. 154(b) by 65 days.

(21) Appl. No.: 13/302,837

(22) Filed: Nov. 22, 2011

(65) Prior Publication Data

US 2012/0127818 A1 May 24, 2012

Related U.S. Application Data

(60) Provisional application No. 61/416,247, filed on Nov. 22, 2010, provisional application No. 61/430,400, filed on Jan. 6, 2011.

(51) Int. Cl.
*G11C 8/00* (2006.01)

(52) U.S. Cl.
USPC .............................. 365/230.03; 365/185.09

(58) Field of Classification Search
USPC ........................ 365/230.03, 185.09
See application file for complete search history.

(56) References Cited

U.S. PATENT DOCUMENTS

| 4,870,643 | A | 9/1989 | Bultman et al. |
| 5,414,455 | A | 5/1995 | Hooper et al. |
| 5,508,732 | A | 4/1996 | Bottomley et al. |
| 5,581,479 | A | 12/1996 | McLaughlin et al. |
| 5,636,139 | A | 6/1997 | McLaughlin et al. |
| 6,397,324 | B1 * | 5/2002 | Barry et al. ............... 712/225 |
| 7,437,472 | B2 | 10/2008 | Rose |
| 7,451,467 | B2 | 11/2008 | Carver et al. |
| 2003/0046477 | A1 | 3/2003 | Jeddeloh |
| 2003/0120861 | A1 | 6/2003 | Calle et al. |

FOREIGN PATENT DOCUMENTS

WO    WO-2010/071655 A1    6/2010

OTHER PUBLICATIONS

International Search Report and Written Opinion for International Application No. PCT/US2011/061925 mailed Mar. 7, 2012.
U.S. Appl. No. 12/706,704, Aviran Kadosh, et al., "Switch Device having a Plurality of Processing Cores," filed Feb. 16, 2010.
International Preliminary Report on Patentability for International Application No. PCT/US2011/061925 mailed May 30, 2013.

* cited by examiner

*Primary Examiner* — Son Dinh
*Assistant Examiner* — Nam Nguyen

(57) ABSTRACT

In a memory device having a set of memory banks to store content data, at least two requests to perform respective memory operations in a first memory bank are received during a single clock cycle. One or more of the at least two requests is blocked from accessing the first memory bank, and in response: redundancy data associated with the first memory bank and different from content data stored therein is accessed, and, without accessing the first memory bank, at least a portion of the content data stored in the first memory bank is reconstructed based on the associated redundancy data. A first memory operation is performed using the content data stored in the first memory bank, and a second memory operation is performed using content data reconstructed i) without accessing the first memory bank and ii) based on the associated redundancy data.

20 Claims, 7 Drawing Sheets

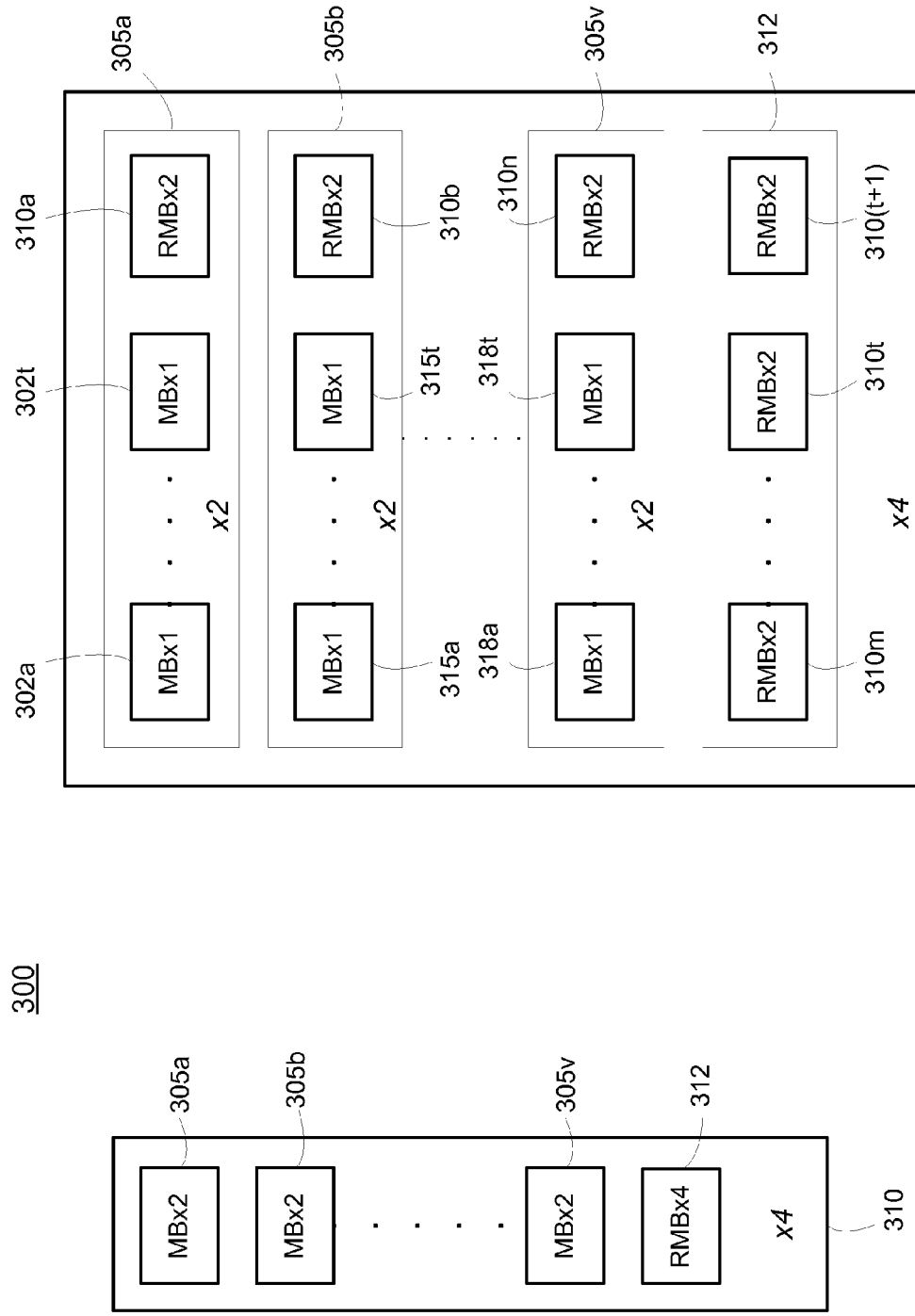

SHARING ACCESS TO A MEMORY AMONG CLIENTS

CROSS-REFERENCES TO RELATED APPLICATIONS

The present application claims the benefit of U.S. Provisional Application No. 61/416,247 entitled "Table Sharing Among Clients," which was filed on Nov. 22, 2010 and also claims the benefit of U.S. Provisional Application No. 61/430,400 entitled "Table Sharing Among Clients," which was filed on Jan. 6, 2011, the entire disclosures of which are hereby incorporated by reference herein.

FIELD OF THE DISCLOSURE

The present disclosure relates generally to concurrently performing operations in a memory, and more particularly, to concurrent memory access by switching devices used in communication networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Conventional memory devices are typically configured so that during any given clock cycle only a single memory operation, such as a read operation, can be performed at a particular block of memory. In the context of some networking or switching applications, various data that is used for packet processing, for example control tables, forwarding tables and the like, are shared among various switching devices or switching cores of a single device. These multiple devices and cores together offer the ability to switch among a large number of ports. However, limitations on the ability of the multiple devices and cores to speedily access data stored in a shared memory can result in a reduction of switching capabilities. Alternatively, providing each device with its own memory device can be expensive both in terms of the direct cost of additional memory as well as in terms of resources required to the different memories synchronized.

SUMMARY

In one embodiment, a method of performing memory operations in a memory device having a set of memory banks to store content data includes receiving, during a single clock cycle, at least two requests to perform respective memory operations in a first memory bank in the set of memory banks. The method also includes determining that one or more of the at least two requests is blocked from accessing the first memory bank. Additionally, the method includes, in response to determining that the one or more of the at least two requests is blocked from accessing the first memory bank: accessing redundancy data associated with the first memory bank and different from content data stored in the first memory bank, and reconstructing, without accessing the first memory bank, at least a portion of the content data stored in the first memory bank based on the redundancy data associated with the first memory bank. The method further includes performing a first requested memory operation using the content data stored in the first memory bank, and performing a second requested memory operation using content data reconstructed 1) without accessing the first memory bank and ii) based on the redundancy data associated with the first memory bank.

In another embodiment, a memory device includes a set of memory banks to store content data, the set of memory banks including a first memory bank. The memory device also includes a memory controller configured to: when at least two requests to perform respective memory operations the first memory bank are received during a single clock cycle, determine that one or more of the at least two requests is blocked from accessing the first memory bank; in response to determining that the one or more of the at least two requests is blocked from accessing the first memory bank: access redundancy data associated with the first memory bank, the redundancy data associated with the first memory bank being different from content data stored in the first memory bank, and reconstruct, without accessing the first memory bank, at least a portion of the content data stored in the first memory bank based on the redundancy data associated with the first memory bank; perform a first requested memory operation based on the content data stored in the first memory bank; and perform a second requested memory operation based on content data reconstructed i) without accessing the first memory bank, and ii) based on the redundancy data associated with the first memory bank.

In yet another embodiment, a network device comprises a set of memory banks to store content data, and a switching core configured to access the set of memory banks and to perform a packet processing operation based on content data stored in the set of memory banks. The network device also comprises a memory controller configured to: receive, from the switching core, a request to perform a memory operation in a first memory bank, the first memory bank included in the set of memory banks; determine that at least a portion of the switching core is blocked from accessing the first memory bank; in response to the determination that the at least the portion of the switching core is blocked from accessing the first memory bank: access redundancy data associated with the first memory bank, the redundancy data being different from content data stored in the first memory bank, and reconstruct, without accessing the first memory bank, at least a portion of the content data stored in the first memory bank based on the redundancy data associated with the first memory bank; and perform the requested memory operation using content data reconstructed i) without accessing the first memory bank, and ii) based on the redundancy data associated with the first memory bank.

BRIEF DESCRIPTION OF THE DRAWINGS

FIGS. 4A-4D are block diagrams of a memory architecture having multiple levels, according to an embodiment;

DETAILED DESCRIPTION

Example shared memory devices and methods for sharing memory space among several client devices are described herein. For explanatory purposes, example shared memory devices are described in the context of a multi-core switch for processing packets transmitted over a communication network. It is noted, in light of the disclosure and teachings herein, that similar methods and apparatus for memory sharing are suitable wherever several client devices, such as processors, processor cores, circuits, pipeline stages, etc., need to simultaneously perform memory operations, such as (but not only) a read operation, on a shared memory. The described shared memory apparatus methodologies are not limited to use in communication network devices, but rather may be utilized in other suitable contexts as well.

Figure 1:
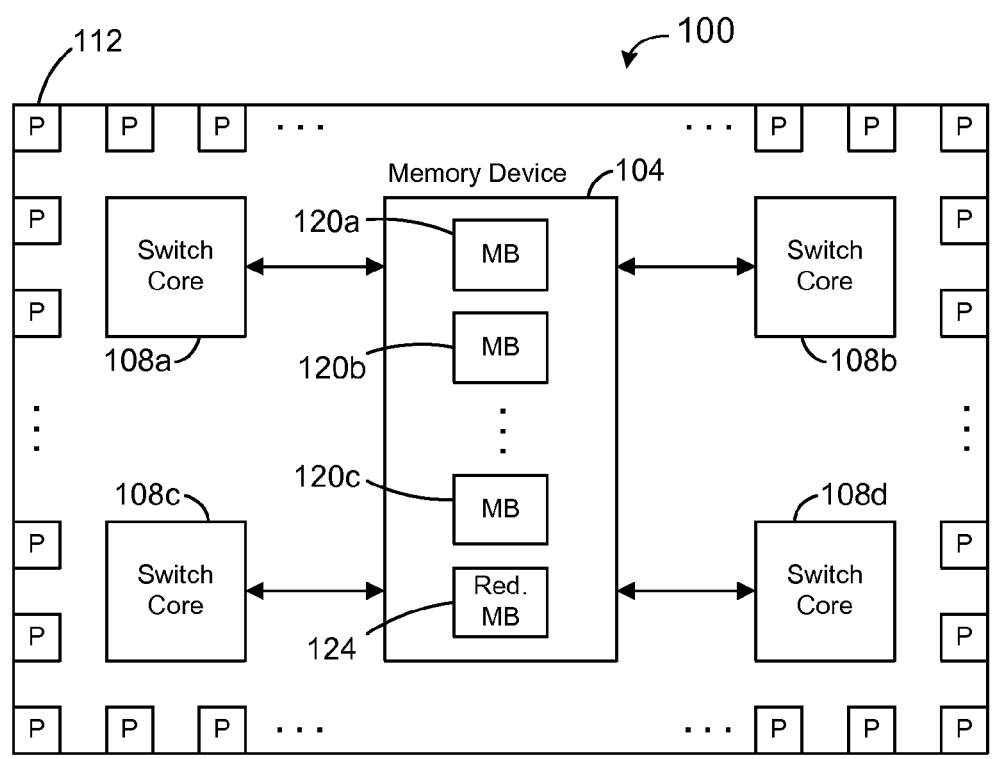
FIG. 1 is a block diagram of an example network device including a shared access memory, according to an embodiment.

FIG. 1 is a block diagram of an example multi-core network device 100, such as a Layer-2 and/or Layer-3 switch, according to an embodiment. The network device 100 includes a memory device 104 coupled to and utilized by multiple packet processing cores 108, also referred to herein as switch cores or switching cores, as will be described in more detail below. The network device 100 also includes a plurality of ports 112, and each port 112 is coupled to a respective communication link associated with a communication network. The packet processing cores 108 are configured to process packets received via the ports 112 and to determine respective ports 112 via which the packets should be subsequently transmitted, in an embodiment.

The packet processing cores 108 utilize one or more control tables, such as a forwarding database table, that are stored in the memory device 104, in an embodiment. Because the packet processing cores 108 operate in parallel, two or more of the cores 108 may need to perform memory operations on a same portion of the memory device 104 simultaneously, for example to perform simultaneous read operations to obtain forwarding information for packets that come from, or that are destined for, the same address.

As will be described in more detail below, the memory device 104 includes a first set of memory banks 120 to store content data, such as one or more control tables, in an embodiment. The memory device 104 also includes a second set of one or more memory banks 124 to store redundancy information associated with content data stored in the first set of memory banks 120. When the memory device 104 simultaneously receives (e.g., during a same clock cycle of the memory device 104) multiple requests to perform memory operations in one of the memory banks 120, the memory device 104 is configured to determine that one or more of the multiple requests is blocked from accessing the one memory bank 120, in an embodiment. In response to determining that one or more of the multiple requests was blocked from accessing the one memory bank 120, the memory device 104 is configured to access redundancy data from the memory bank 124 and to reconstruct data stored in the one memory bank 120 using the redundancy data and without using data stored in the one memory bank 120. One of the requested memory operations is performed using data stored in the one memory bank 120. On the other hand, another one of the requested memory operations is performed without accessing the one memory bank 120 and based on the data reconstructed using the redundancy data from the memory bank 124, in an embodiment.

In the network device 100, each packet processing core 108 generally acts as a client that generates requests to perform memory operations in one or more memory banks 120 of the memory device 104. The term "client," as used herein, refers to a device configured to generate requests to perform memory operations in one or more memory banks of a memory device. In an embodiment in which a packet processing core 108 includes multiple devices (e.g., circuits) each configured to generate requests to perform memory operations in one or more memory banks 120 of the memory device 104, then the packet processing core 108 includes or acts as multiple clients. For example, in an embodiment in which a packet processor includes a pipeline with a plurality of pipeline stages, and multiple pipeline stages are configured to generate requests to perform memory operations in one or more memory banks of a memory device, the packet processor includes or acts as multiple clients. As another example, a single processor or single pipeline stage is configured to generate simultaneously multiple memory access requests, and thus the single processor or single pipeline stage includes or acts as multiple clients.

In an embodiment, the network device 100 utilizes methods and apparatus described in U.S. patent application Ser. No. 12/706,704, filed on Feb. 16, 2010 and entitled "SWITCH DEVICE HAVING A PLURALITY OF PROCESSING CORES," the entire contents of which are incorporated by reference herein.

In an embodiment, the memory device 104 is a solid-state device. For example, the memory device 104 is included on an integrated circuit (IC) or other solid-state device. In an embodiment, the memory device 104 and the packet processing cores 108 are included on a single IC.

Although the memory device 104 is discussed above as being included the network device 100, similar memory devices may be utilized in other types of computing systems such as personal computers, servers, mainframes, smart phones, gaming systems, set top boxes, communication equipment, etc. For example, a computing system may include multiple devices (e.g., processors (e.g., central processing units, coprocessors, special-purpose processing units, etc.), circuits, pipeline stages, etc.) that each act as a client with respect to a memory device such as the memory device 104.

Figure 2:
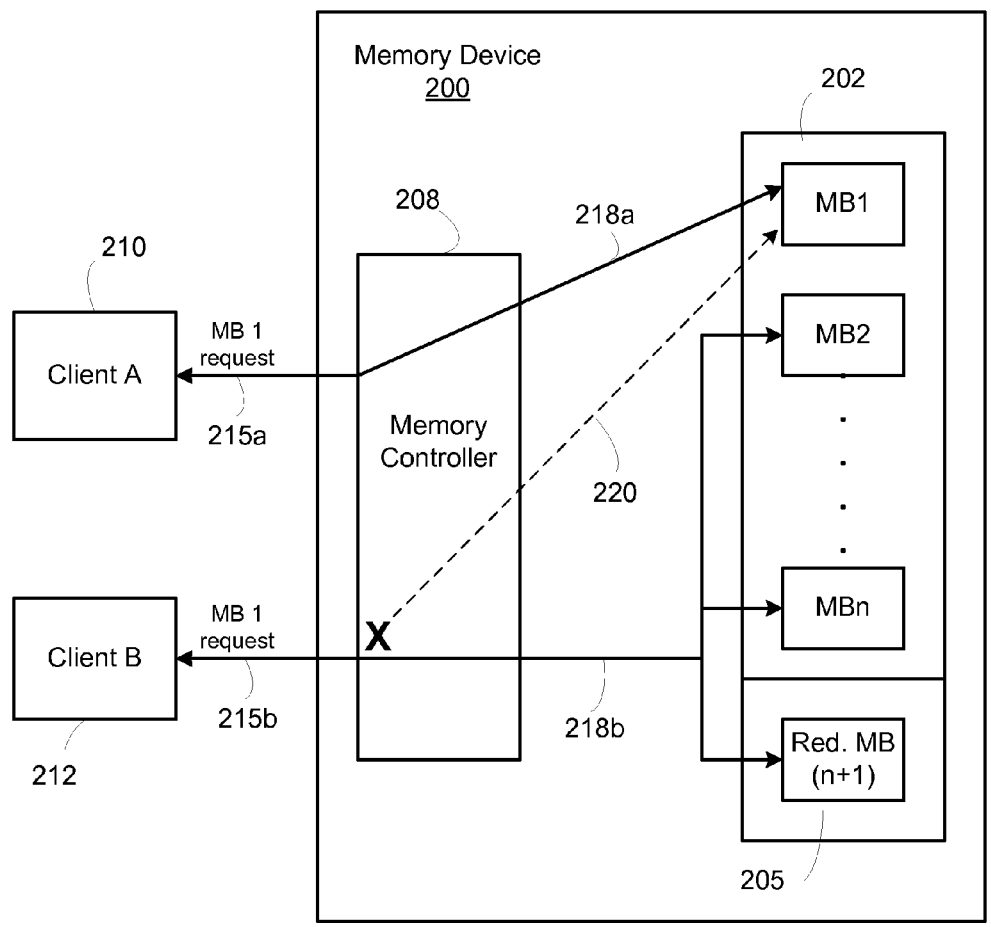
FIG. 2 is a block diagram of an example shared access memory device, according to an embodiment.

FIG. 2 is a block diagram of a memory device 200 configured for shared access, e.g., a shared memory device 200, according to an embodiment. The memory device 200 is utilized as the memory device 104 of FIG. 1, in an embodiment. In another embodiment, another suitable memory device is utilized as the memory device 104 of FIG. 1. Similarly, the memory device 200 is utilized in a network device different than the network device 100 of FIG. 1, or in a computing device used in contexts other than network switching, in other embodiments.

The memory device 200 includes a first set of n (one or more) memory banks 202 (MB1, MB2, . . . , MPn) to store content data. When used in the context of a network device, the set of one or more memory banks 202 stores one or more control tables or other data suitable for use in a network device, in an embodiment. The memory device 200 includes a second set of one or more memory banks 205 (Redundant MB) to store redundancy data corresponding to the content data stored in the one or more memory banks 202. The memory device 202 also includes a memory controller 208 to perform memory operations on content data stored in the one or more memory banks 202, in an embodiment. For example, the memory controller 208 is configured to receive requests for memory operations from two or more clients 210, 212, and in response to the requests, to perform memory operations (e.g., read memory operations) with respect to the content data stored in one or more of the memory banks 202.

In some embodiments, the memory device 200 is a logical arrangement of physical resources, and in some embodiments, the memory device 200 is at least partially a physical arrangement of physical resources. In an embodiment, each memory bank (e.g., MB1-MBn, Redundant MB) is of a same size and includes a same set of one or more unique addresses. For example, each memory 202 and each memory 205 corresponds to a same address space (e.g., 001 through g), in an embodiment. In other embodiments, the memory banks (e.g., MB1-MBn, Redundant MB) may have two or more different sizes and/or correspond to two or more different address spaces.

In an embodiment, the n memory banks 202 store content data that is utilized by the clients 210, 212. The memory bank 205 corresponds to an (n+1)-th memory bank of the memory device 200, and stores redundancy data that is based on content data stored in the memory banks 202 (MB1-MBn), in an embodiment. The redundancy data may be generated or calculated based on an error correction code operation, such as a parity calculation, a cyclic redundancy check (CRC) code, etc. In an embodiment, the memory bank 205 stores a result of a bitwise exclusive-or (XOR) function applied to content data stored in the memory banks 202. In a particular example, the bitwise XOR function is applied on a per-address basis, so that if a is a particular address from the range 001 through g, then the contents of a particular address a of the memory bank 205 is represented by the expression:

$$B_{(n+1)}(a) = \Sigma_{i=1}^{i=n} B_i(a), \quad (1)$$

Where $B_i(a)$ represents contents of the a-th address of the i-th memory bank and the summation represents the bitwise XOR function. In this example, although an error correction code operation is used to determine or generate the redundancy data stored in the memory bank 205 (Redundant MB), the redundancy data is not necessarily used to correct content data errors. Rather, the redundancy data is to reconstruct content data stored in a memory bank (e.g., one of the memory banks MB1-MBn) that is blocked to a requesting client, thus enabling shared access to contents of the memory bank that is blocked to the requesting client, as is described in more detail below.

The memory device 200 is configured to enable shared access to the content data stored in the set of memory banks 202, in an embodiment. That is, when a particular memory bank is being directly accessed on behalf of a first client and as a result blocked to direct access on behalf of other clients, the memory device 200 is configured to enable reconstruction of the content data of the particular memory bank for a second client, without direct access to the particular memory bank. In an example scenario illustrated in FIG. 2, during a particular single clock cycle (e.g., a clock cycle of the memory device 200, a clock cycle of a solid state device that includes the memory device 200, etc.), both Client A (reference 210) and Client B (reference 212) submit requests to the memory controller 208 to perform respective memory operations on the memory bank MB1, as denoted by respective references 215a and 215b. The memory controller 208 determines that Client A's request 215a is granted or allowed, and performs Client A's requested memory operation on the content data stored in the memory bank MB1 (as denoted in FIG. 2 by the solid arrow 218a to/from MB1 in connection with Client A's request 215a). In an embodiment, the memory controller 208 determines that Client A's request 215a is granted or allowed based on priority information associated with the clients, based on an order of received requests, and/or based on another desired or suitable criteria.

The memory controller 208, though, blocks or denies Client B's request to perform the corresponding requested memory operation on the memory bank MB1 in this example scenario. The block or denial is denoted in FIG. 2 by reference 220, where the X represents the block or denial of Client B's request and the small-dashed line represents Client B's unrealized request to access the memory bank MB1. However, in order to provide shared access to the content data stored in the memory bank MB1 for Client B (e.g., access to the content data stored in the memory bank MB1 in concert with Client A's access), the memory controller 208 instead accesses memory banks MB2 through MBn and the memory bank 205 to read respective data stored therein, in an embodiment. The memory controller 208 performs an error correction code calculation (such as a parity calculation or a bit-wise XOR operation or other suitable function) on the content data stored in the memory banks MB2 through MBn and on the redundancy data stored in the memory bank 205. The error correction calculation is used by the memory controller 208 to reconstruct the content data stored in the memory bank MB1 without directly accessing the memory bank MB1, in an embodiment. This reconstruction is depicted in FIG. 2 by solid arrows 218b in connection with Client B's request 215b. Thus, the memory controller 208 is configured to reconstruct contents of the memory bank MB1 without directly accessing the memory bank MB1 and based on redundancy data stored in the memory bank 205. As such, access to the content data stored in the memory bank MB1 is shared between Client A and Client B.

In an embodiment, to realize the shared access, the memory controller 208 accesses other memory banks (e.g., MB2 through MBn and memory bank 205) of the memory device 200 in a single clock cycle. In some embodiments, to realize the shared access, the memory controller 208 accesses other multiple memory banks (e.g., MB2 through MBn and memory bank 205) of the memory device 200 over more than one clock cycle.

Accordingly, for the memory device 200, an overhead of 1/n memory banks results in a doubling of the memory access bandwidth of a system or device that includes the memory device 200 (e.g., x2 bandwidth), which is a significant savings over the n overhead memory banks required when two different clients each access a dedicated memory to store a respective local copy of content data. That is, with a mere 1/n memory overhead, two clients 210 and 212 are each able to request a memory operation to be performed on content data of a same memory bank (e.g., MB1) of the memory device 200 during a same clock cycle, e.g., in an essentially simultaneous, overlapping or concurrent fashion, in an embodiment.

Although the example scenario discussed above describes two clients 210 and 212 attempting to access the same memory bank during a single clock, the principles illustrated by the example scenario are easily adapted to other scenarios for shared access to the set of memory banks 202. For example, in another scenario, Client A requests the memory controller 208 to access the memory bank MB1 and the request is granted, but the access operation corresponding to Client A's request is performed over multiple clock cycles. During one of the multiple clock cycles during which the memory controller 208 is performing Client A's request, Client B requests the memory controller 208 to access the same memory bank MB1. As the memory bank MB1 is blocked from direct access due to Client A's request, the memory controller 208 instead directly accesses the memory banks MB2 through MBn and memory bank 205 of the memory device 200 to perform the memory operation requested by Client B. As another example, more than two clients may be capable of submitting requests to the memory controller 208. If a third client attempts to access memory bank MB1 at the same time as Client A and Client B, the memory controller 208 may merely block the request of the third client, in an embodiment. The third client may thus resubmit its request at a later time.

Further, although shared access of the memory device 200 was described above using read memory operations, the techniques and principles also apply to other memory operations such as write memory operations. In an example, a change to content data stored in the memory bank MB2 is determined, and the change is written to the memory bank MB2 so that the content data stored in the memory bank MB2 is updated. The redundancy data stored in the memory bank 205 (e.g., parity calculation or error correction code calculation results) is also updated based on the changes to the content data stored in MB2, for example, by bitwise XORing the current contents of memory bank 205 with the change to the content data stored in MB2. In an embodiment, prior to the updating of the contents of the memory bank 205, if desired, current contents of the memory bank 205 corresponding to one or more read accesses are saved in another memory, such as in a shadow table stored in a memory of a central processing unit (CPU).

Figure 3:
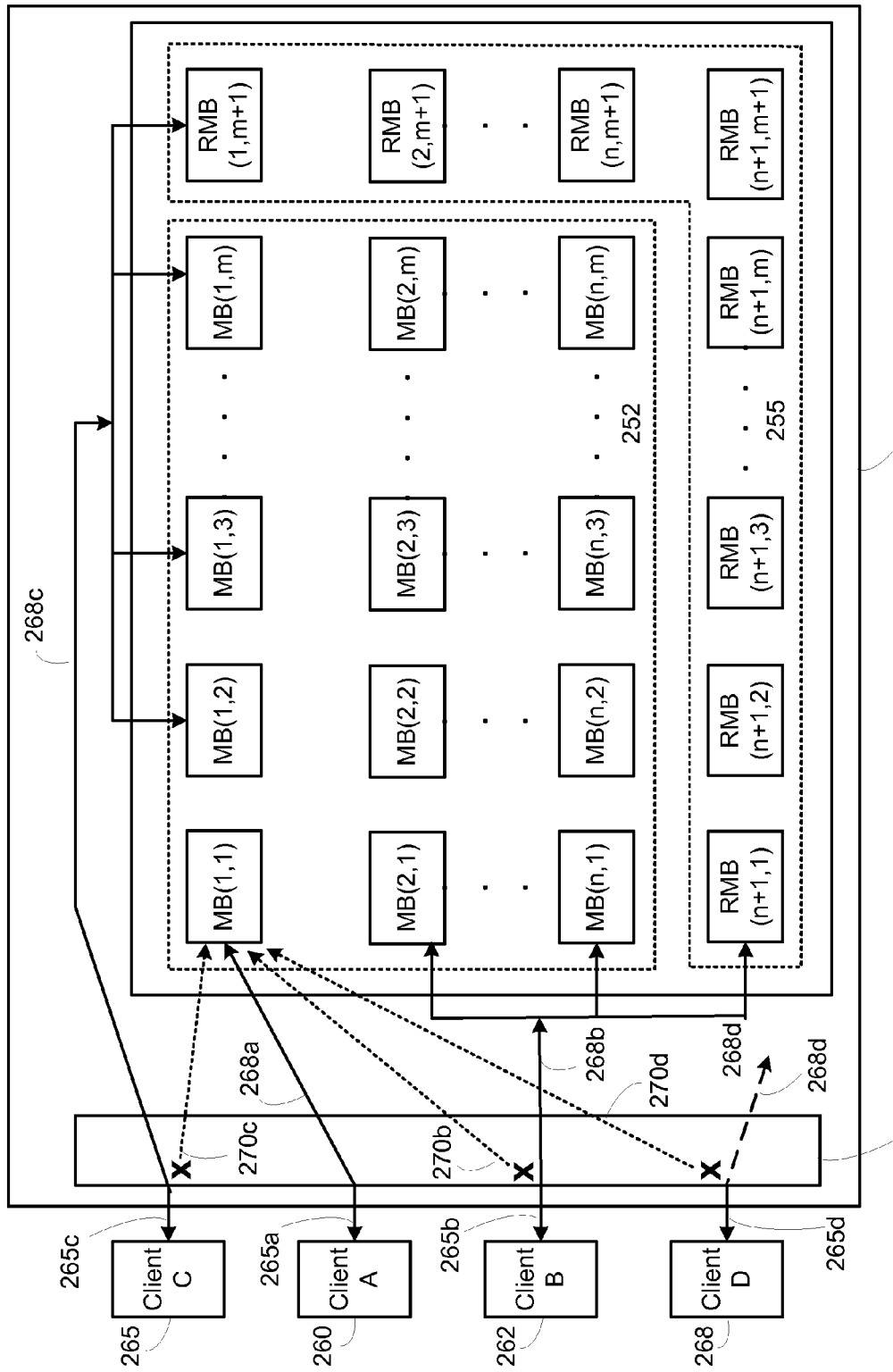
FIG. 3 is a block diagram of another example shared access memory device, according to an embodiment.

FIG. 3 is a block diagram of a shared memory device 250 that is configured so up to four clients are able to perform respective memory operations in a given memory block during a same clock cycle, e.g., in an essentially simultaneous, overlapping or concurrent fashion, in an embodiment. The memory device 250 is utilized as the memory device 104 of FIG. 1, in an embodiment. In another embodiment, another suitable memory device is utilized as the memory device 104 of FIG. 1. Similarly, the memory device 250 is utilized in a network device different than the network device 100 of FIG. 1, or in a computing device used in contexts other than network switching, in other embodiments.

It is noted that by enabling concurrent access of four clients to any location of the memory device 250, memory access bandwidth of a system including the memory device 250 may increase by as much as four-fold, in some embodiments. In an embodiment, the memory device 250 is configured to allow up to four clients to determine the content data stored in a same memory bank in an essentially simultaneous, overlapping or concurrent fashion. In some embodiments, the memory device 250 is a logical arrangement of physical resources, and in some embodiments, the memory device 250 is at least partially a physical arrangement of the physical resources.

In the embodiment illustrated in FIG. 3, the shared memory device 250 includes a set of memory banks 252 to store content data, a set of redundant memory banks 255 to store redundancy data, and a memory controller 258 to perform memory operations on content data stored in the set of memory banks 252. For embodiments in which the memory device 250 is included in a packet processing system such as the network device 100 of FIG. 1, contents of a shared control table of the packet processing system may be stored in the initial memory banks 252.

The memory controller 258 is configured to receive requests for memory operations from two or more clients 260, 262, 265, 268, and in response to the requests, to perform memory operations (e.g., read memory operations) with respect to the content data stored in one or more of the memory banks 252. For example, the memory controller 258 may access one or more of the memory banks 252 to read data stored therein.

In the memory device 250, n×m memory banks 252 are arranged in a logical array having dimensions of n×m, in an embodiment. For example, in the memory device 250, the set of total memory banks 252 is arranged into n rows and m columns. Each initial memory bank is referred to in FIG. 4 by the notation MB (r, t), where r indicates a row from a range 1 through n, and t indicates a column from a range 1 through m.

Redundant memory banks 255 are arranged in the logical array as row n+1 and in column m+1, in an embodiment. Of course, other arrangements of the redundant memory banks 255 are possible, such as including the redundant memory banks in a first row and a first column of the logical array, or other suitable arrangements. In the embodiment of FIG. 3, however, each row r includes a respective redundant memory bank RMB (r, m+1) whose contents correspond to an error correction code calculation (e.g., a parity calculation) that is based on contents of respective memory banks 252 of the row r, in an embodiment. In an embodiment, the memory bank RMB1 stores a result of a bitwise exclusive-or (XOR) function applied to content data stored in the memory banks 252 of the row r. For example, the contents stored at a particular memory bank corresponding to a row r is represented by the expression:

$$B_{(m+1,r)}(a) = \Sigma_{i=1}^{i=m} B_{(i,r)}(a), \quad (2)$$

where $B_{(t,r)}(a)$ represents contents of the a-th address of the t-th, r-th redundant memory bank 255 and the summation represents the bitwise XOR function.

Similarly, in the memory device 250, each column includes a respective additional memory bank AMB (n+1, t) whose contents correspond to a parity calculation based on contents of respective initial memory banks of the column t, in an embodiment. For example, the contents stored at a particular additional memory bank corresponding to a column t is represented by the expression:

$$B_{(t,n+1)}(a) = \Sigma_{i=1}^{i=n} B_{(t,i)}(a). \quad (3)$$

Accordingly, for this example, an overhead of the memory device 250 is represented by the expression:

$$(n+m+1)/(n*m) \quad (4)$$

As such, in an embodiment corresponding to FIG. 3, a minimum overhead for the set of n×m total memory banks 252 is achieved when n=m, e.g., the minimum overhead= $(2n+1)/n^2$, which is approximately 2/n (n corresponding to the square root of the number of memory banks 252 when n=m). Accordingly, in an embodiment corresponding to FIG. 3, when n=m, a minimum overhead of 2/n may result in up to a quadrupling of the memory access bandwidth of a system including the memory device 252, instead of the $3*n^2$ overhead required by network devices in which four different memories are utilized to each store a respective local copy of content data.

FIG. 3 illustrates an embodiment of a memory device 250 configured to enable up to four clients to shared access to the content data stored in a same memory bank (e.g., the memory bank MB (1,1)). In an example scenario, all four Clients A, B, C and D (references 260-268) request the memory controller 258 to perform respective memory operations on the memory bank MB (1,1) during a same clock cycle (e.g., a clock cycle of the memory device 250, a clock cycle of a solid state device that includes the memory device 250, etc.) as denoted by the references 265a-265d. In the illustrated scenario, the memory controller 208 determines that Client A's request 265a is granted, and performs Client A's requested memory operation on the content data stored in the memory bank MB (1,1) (as denoted in FIG. 3 by the solid arrow 268a to/from MB (1,1) in connection with Client A's request 265a). In an embodiment, the memory controller 208 determines that Client A's request 265a is allowed based on priority information associated with the clients, based on an order of received request, and/or based on another desired or suitable criteria.

The memory controller 208, however, blocks or denies Client B's request to perform its requested memory operation on the memory bank MB (1,1) in this scenario. The block or denial is denoted in FIG. 3 by reference 270b, where the X represents the block or denial of Client B's request and the small-dashed line represents Client B's unrealized request to access the memory bank MB (1,1). However, in order to provide shared access to the content data stored in the memory bank MB (1,1) on behalf of Client B (e.g., to determine the content data stored in the memory bank MB (1,1) on behalf of Client B in concert with Client A's request), the memory controller 258 instead performs a column-based reconstruction of the content data stored in the memory bank MB (1,1), in an embodiment. In particular, the memory controller 258 directly accesses other un-accessed memory banks 252 in the column corresponding to the target memory bank MB (1,1) (e.g., memory banks MB (2,1) through MB (n,1) and redundant memory bank RMB (n+1,1)) to read respective data stored therein. The memory controller 208 performs an error correction code calculation (such as a parity calculation or a bit-wise XOR operation or function) on content data stored in other un-accessed memory banks 252 in column 1 (e.g., initial memory banks MB (2,1) through MB (n,1) and redundant memory bank RMB (n+1,1)). The error correction code calculation is used by the memory controller 208 to reconstruct the content data stored in the memory bank MB (1,1) without directly accessing the memory bank MB (1,1), in an embodiment. The reconstructed content data is depicted in FIG. 2 by the solid arrows 268b to/from the un-accessed memory banks 252 in column 1 in connection with Client B's request 265b. As such, the memory controller 208 reconstructs contents of the target memory bank MB (1,1) without directly accessing the memory bank MB (1,1) and based on the redundancy data stored in the redundant memory bank RMB (n+1,1) by using a first dimension of the array.

Turning for a moment back to FIG. 2, it is noted that the reconstruction of the data contents stored in the memory bank MB1 is an example of a column-based reconstruction, where the dimensions of the logical array utilized for reconstruction are n×1.

With further respect to the example scenario of FIG. 3, the memory controller 208 also blocks or denies Client C's concurrent request to perform its requested memory operation on the memory bank MB (1,1). The block or denial of Client C is denoted in FIG. 3 by reference 270c, where the X represents the block or denial of Client C's request and the small-dashed line represents Client C's unrealized request to access the memory bank MB (1,1). In this scenario, Client C's request cannot be fulfilled using a column-based reconstruction, as the memory controller 258 is currently performing a column-based reconstruction on behalf of Client B and the memory banks corresponding to the column-based reconstruction (e.g., memory banks MB (2,1) through MB (n,1) and redundant memory bank RMB (n+1,1)) are blocked from direct access. However, in order to provide shared access to the content data stored in the memory bank MB (1,1) on behalf of Client C (e.g., in concert with both Client A's request and Client B's request), the memory controller 258 instead performs a row-based reconstruction of content data stored in the target memory bank MB (1,1), in an embodiment. In particular, the memory controller 258 accesses all other un-accessed memory banks 252 in the row corresponding to the target memory bank MB (1,1) (e.g., MB (1,2) through MB (1,m) and the redundant memory bank RMB (1, (m+1)) to read respective data stored therein, in an embodiment. The memory controller 208 performs an error correction code calculation (such as a parity calculation or a bit-wise XOR operation or function) on content data stored in the un-accessed memory banks 252 of the corresponding row, excluding the blocked initial memory bank MB (1,1), in an embodiment. For example, the memory controller 258 performs a bit-wise XOR operation or function on contents of MB (1,2) through MB (1,m) and the redundant memory bank RMB (1, (m+1)). The error correction code calculation is used by the memory controller 208 to reconstruct the content data stored in the memory bank MB (1,1) without directly accessing the memory bank MB (1,1), in an embodiment. The reconstructed content data of the target memory bank MB (1,1) is depicted in FIG. 3 by the solid arrows 268c to/from the memory bank MB (1,1) in connection with Client C's request 265c. As such, the memory controller 208 is configured to reconstruct contents of the memory bank MB (1,1) without directly accessing the memory bank MB (1,1) and based on the redundancy data stored in the additional memory bank RMB (1, (m+1) by using a second dimension of the array.

It is noted that while the example scenario first provides a description of a column-based reconstruction being initiated and then provides a description of a row-based reconstruction being initiated, the ordering of initiation of the column-based reconstruction and the row-based reconstruction may be reversed in other scenarios. In some embodiments, the order of reconstruction may be immaterial. For example, when three essentially concurrent requests are contending for content data stored in a same memory bank during a single clock cycle, the memory controller 208 is configured to initiate a direct access, a column-based reconstruction, and a row-based reconstruction without particular regard to the order of initiation of the different types of access.

With still further respect to the example scenario of FIG. 3, the memory controller 208 also blocks or denies Client D's concurrent request to perform its requested memory operation on the memory bank MB (1,1). The block or denial of Client D is denoted in FIG. 3 by reference 270d, where the X represents the block or denial of Client D's request and the small-dashed line represents Client D's unrealized request to access the memory bank MB (1,1). On behalf of Client D, neither a column-based reconstruction nor a row-based reconstruction will be fruitful, as both the column-based reconstruction and the row-based reconstruction are being performed for other clients and, as such, all memory banks of column 1 and of row 1 are blocked from direct access.

Accordingly, the memory controller 258 instead accesses all other un-accessed memory banks 252 and redundant memory banks 255 in the memory device 250 (e.g., memory banks (r, t) where $2 \leq r \leq (n+1)$ and $2 \leq t \leq (m+1)$), in an embodiment, and performs an error correction code operation (such as a parity calculation or a bit-wise XOR operation or function) on the contents stored in all other un-accessed initial and additional memory banks of the (n+1)×(m+1) array to reconstruct content data stored in the target memory bank MB (1,1). For example, a bit-wise XOR operation is performed on the data stored in other un-accessed memory banks 252 and redundant memory banks 255 of the (n+1)×(m+1) array to reconstruct content data stored in the initial memory bank MB (1,1). As such, in this example, content data stored in the initial memory bank MB (1,1) is reconstructed based on redundancy data stored in the redundant memory banks RMB (n+1, 2) through RMB (n+1, m+1) and RMB (2, m+1) through RMB (n, m+1), and without directly accessing the memory bank MB (1,1). Accordingly, the memory controller 258 reconstructs the content data stored in the target memory bank MB (1,1) by using unaccessed memory banks (which is suggestively illustrated by the large-dashed arrow 268d connected to Client D's request 265d).

Accordingly, as the number of concurrent access requests increases, the contents stored in a target memory bank may be reconstructed using increasing dimensions of an array of memory banks and corresponding redundant memory banks 255. Indeed, while FIG. 3 illustrates a two-dimensional arrangement of the memory banks 252 (e.g., n×m), in other embodiments, an arrangement of the memory banks is straightforwardly expanded to more than two dimensions (e.g., n×m×p, n×m×p×q, and so on) to support desired additional memory access bandwidth and concurrent client requests in a similar fashion.

Similar to FIG. 2, although the example scenario discussed above with respect to the memory device 250 of FIG. 3 describes up to four clients 260-268 attempting to access the same memory bank during a single clock cycle, the principles illustrated by the example scenario are easily adapted to other scenarios for concurrent shared access to the set of memory banks 252, such as when a first client's request has blocked direct access to a target memory bank over several clock cycles, or when there are more than four clients. Also similar to FIG. 2, the principles illustrated by the example scenario of FIG. 3 are not limited to only read memory operations, but may be applied to other memory operations such as write memory operations.

FIGS. 4A-4D illustrates a scalable architecture 300 that enables increasing numbers of possible essentially simultaneous, concurrent or overlapping memory operations to be performed in a memory device. The scalable architecture 300 may be included, for example, in embodiments of the memory device 104 of FIG. 1, the memory device 200 of FIG. 2, and/or the memory device 250 of FIG. 3. In some embodiments, the architecture 300 is a logical arrangement of physical resources, and in some embodiments, the architecture 300 is at least a partially physical arrangement of physical resources.

The scalable architecture 300, in an embodiment, supports a recursive approach to providing increasing access to a shared memory that is scalable above x4 memory access bandwidth, if desired. In particular, the scalable architecture 300, in an embodiment, is an arrangement of memory banks that may be configured for different levels of memory access bandwidth such as two levels, three levels, or some other suitable or desired number of levels. In an embodiment, each higher level of the scalable architecture 300 corresponds to an increased memory access bandwidth, and an arrangement of a particular level is based on the arrangement of an immediately lower level, as is described in detail below. A shared memory device (e.g., the memory device 104, 200 or 250) is configured with a desired number of levels to support a desired memory access bandwidth, in an embodiment.

As used herein, the notation "xb", where b is an integer, refers to a magnitude of shared memory access or memory access bandwidth. For example, "x1" refers to a memory architecture where only one client is able to access content data stored in a particular memory bank during a clock cycle. "x2" refers to a memory architecture that allows two clients to concurrently determine content data stored in a particular memory bank (e.g., a doubling of bandwidth over an x1 device), "x4" refers to a memory architecture that allows four clients to concurrently determine content data stored in a particular memory bank (e.g., a quadrupling of bandwidth over an x1 device), and so on.

Figure 4B:
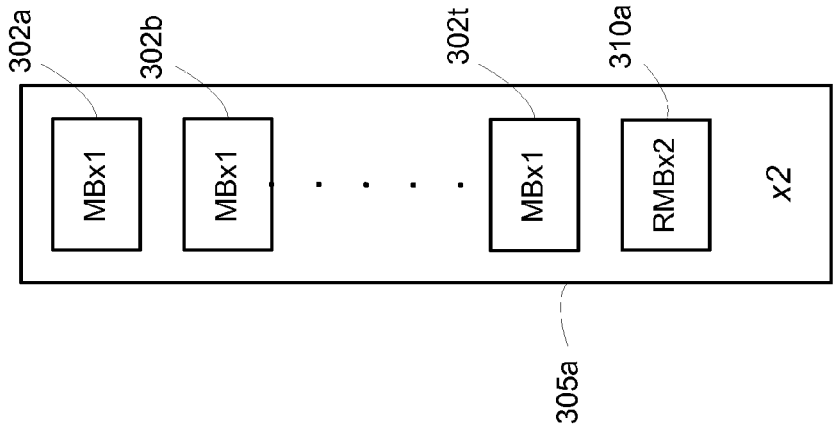
Figure 4A:
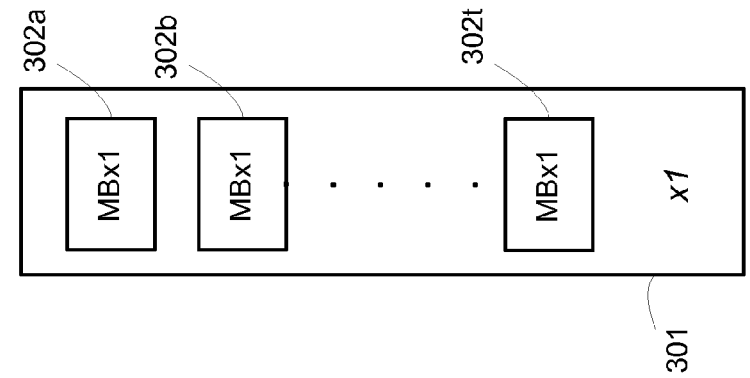

In an embodiment, the scalable architecture 300 is configured at an initial level 301 that supports unitary bandwidth access (e.g., x1), as illustrated in FIG. 4A. In particular, for each clock cycle, the content data stored in each memory bank 302a-302t is directly accessible by a memory controller for only one client. Accordingly, each initial memory bank 302a-302t thus has a unitary access bandwidth, and is generically referred to as "MBx1."

FIG. 4B illustrates an embodiment of a second level 305a of the scalable architecture 300 that supports a doubling of memory access bandwidth (e.g., x2) over the memory access bandwidth provided by the initial level 301. The second level 305a of the scalable architecture 300 utilizes a grouping of memory banks that includes the set of unitary memory banks 302a-302t and a corresponding redundant memory bank 310a. Content data is stored in the set of unitary memory banks 302a-302t, and redundancy data is stored in the second level redundant memory bank 310a. In an embodiment, the redundancy data stored in the redundant memory bank 310a includes a result of an error correction code operation based on the content data stored in the memory banks 302a-302t. For example, the error correction code operation is a parity calculation or a bitwise XOR function or operation of content data stored in the memory banks 302a-302t. As such, when the scalable architecture 300 is configured at the second level 305a, two clients are able to concurrently obtain content data stored in the memory banks 302a-302t. For example, the memory controller directly accesses content data stored in a target memory bank 302 on behalf of a first client, and the memory controller reconstructs content data of the target memory bank 302 in a manner such as discussed previously with respect to FIG. 2 on behalf of a second client. It should be noted that the redundant memory bank 310a is generically referred to herein as "RMBx2," as the second level redundant memory bank 310a allows for x2 memory access bandwidth of a shared memory device.

FIG. 4C illustrates an embodiment of a third level 310 of the scalable architecture 300 (e.g., a next higher level than the second level 305a illustrated in FIG. 4B). The third level 310 supports up to a quadrupling of memory access bandwidth (e.g., x4) over the initial level 301, in an embodiment. The third level 310 includes a plurality of instances of second level groupings 305a-305v to store content data, in an embodiment. With regard to conventions used herein, each instance 305a-305v of a second level grouping is generically referred to as "MBx2," as each second level grouping is configured to accommodate x2 memory access bandwidth of a shared memory device. In an example, the second level grouping 305a of FIG. 4B is included in the third level grouping 310 of FIG. 4C.

Each third level grouping 310 of initial memory banks additionally includes a corresponding redundant memory bank 312 (generically referred to herein as "RMBx4," as the third level additional memory banks allow x4 memory access bandwidth of a memory device), in an embodiment. The redundant memory bank 312 at the third level 310 is to store redundancy data corresponding to the second level groupings 305a-305v. For example, the third level additional memory bank 312 includes a result of an error correction code calculation based on content data stored in the second level groupings 305a-305v, in an embodiment. In one example, when the scalable architecture 300 is included in a packet processing system such as the network device 100 of FIG. 1, a shared content table is stored across each of the unitary memory banks 302a-302t of first level grouping 305a and across respective unitary memory banks corresponding to the other first level groupings 305b-305v, and redundancy data corresponding to results of bit-wise XOR operations on the content data stored in groupings 305a-305v is stored in the redundant memory bank 312.

FIG. 4D illustrates an expanded view of the third level grouping 310 of FIG. 4C. Each second level grouping 305a-305v is expanded to show its respective set of unitary memory banks and corresponding redundant memory bank. For example, second level grouping 305a includes unitary memory banks 302a-302t and corresponding redundant memory bank 310a to store redundancy data based on content data stored in the memory banks 302a-302t. Second level grouping 305b includes unitary memory banks 315a-315t and corresponding redundant memory bank 310b to store redundancy data based on content data stored in the memory banks 315a-315t. Second level grouping 305v includes unitary memory banks 318a-318t and corresponding redundant memory bank 310n to store redundancy data based on content data stored in the memory banks 318a-318t. As such, in an embodiment where the x4 scalable arrangement 310 of FIG. 4D is included in a network device (e.g., the network device 100 of FIG. 1) the content of a shared data table used by switch cores to process packets is stored across the unitary memory banks IMBx1, e.g., banks 302a-302t, 315a-315t, . . . , and 318a-318t, a result of a bit-wise XOR operation on content data stored in banks 302a-302t is stored as redundancy data in redundant memory bank 310a, a result of a bit-wise XOR operation on content data stored in banks 318a-318t is stored as redundancy data in redundant memory bank 310n, and so on.

The third level redundant memory bank 312 of FIG. 4C is also expanded in FIG. 4D to show that the bank 312 includes a set of redundant memory banks 310m-310(t+1), each of which stores respective results of an error correction code calculation corresponding to contents of corresponding subsets of memory banks storing content data. For example, redundant memory bank 310m includes results of an error correction code calculation corresponding to contents of MBx1 memory banks 302a, 315a, . . . , and 318a. Redundant memory bank 310t includes results of an error correction code calculation corresponding to the contents of MBx1 memory banks 302t, 315t, . . . , and 318t. Redundant memory bank 310(t+1) includes a result of an error correction calculation corresponding to the RMBx1 additional memory banks 310a, 310b, . . . , and 310n. In an embodiment, the error correction code calculations corresponding to the redundant memory banks 310a-310n and 310m-320(t+1) are each parity calculations such as bitwise XOR functions or operations performed on the respective content data.

Thus, by scaling the architecture 300 to include a third level grouping 310, up to four clients are able to concurrently request access to content data stored in a particular unitary memory bank, e.g., one of memory banks 302a-302t, 315a-315t, or 318a-318t. In an embodiment, to fulfill the request of a third or a fourth client request for access to the content data stored in a target memory bank, a first error correction code calculation in the manner such as discussed previously with respect to FIG. 2 is applied to the third level grouping 310, and then a next error correction calculation is recursively applied to an appropriate second level grouping 305a-305v.

It is noted that the scalable architecture 300 can be scaled to levels higher than x4 to support desired increased memory access bandwidths. Generally, a desired level of scalability of the architecture 300 includes a set of groupings of the immediately previous lower level. A redundant memory block at the desired level of scalability is associated to each grouping of the immediately previous level, and stores a result of error correction code calculations of the set of groupings of the immediately previous level. In an embodiment, a memory controller (e.g., controller 308, controller 358 or a similar controller) may reconstruct the content data stored in a target unitary memory block by recursively performing error correction calculations (e.g., parity calculations such as bitwise XOR operations or functions) without directly accessing the target unitary initial memory block.

Figure 5:
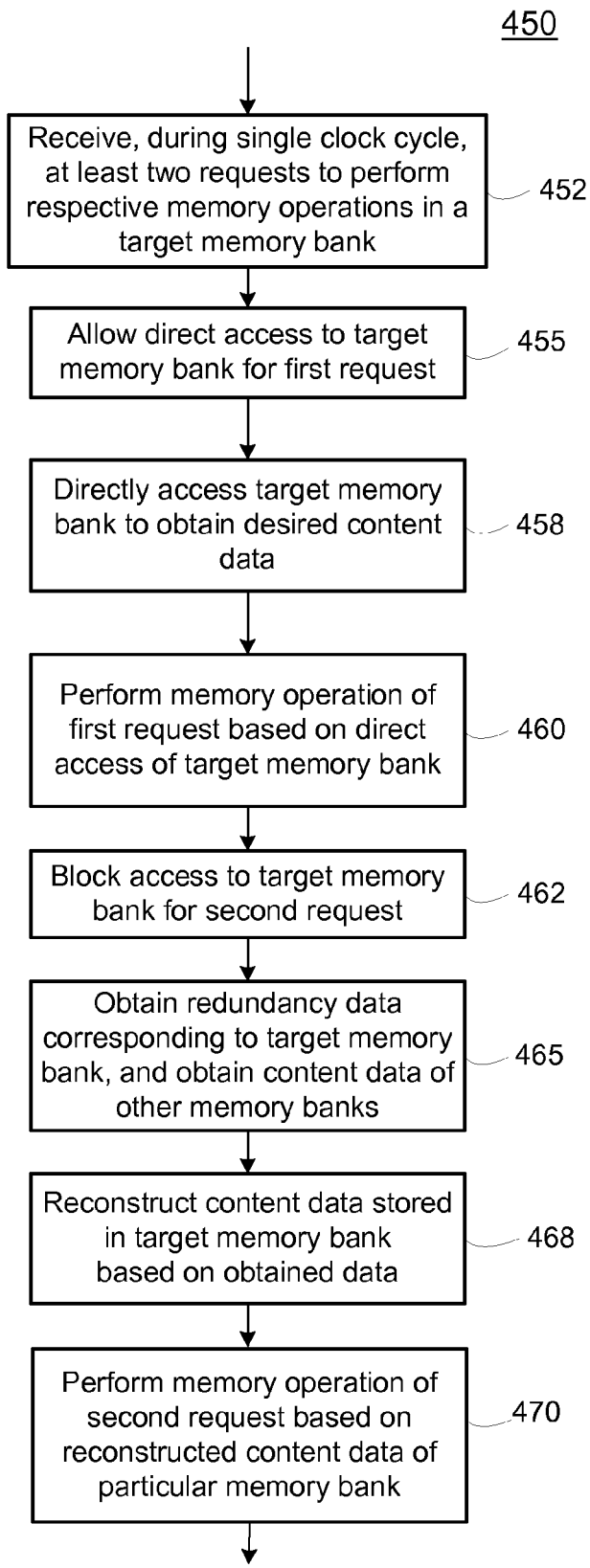
FIG. 5 is a flow diagram of an example method of performing memory operations in a shared access memory device having a set of memory banks to store content data, according to an embodiment.

FIG. 5 is flow diagram of an example method 450 of performing memory operations in a memory device having a first set of memory banks to store content data and a second set of one or more memory banks to store redundant data associated with the content data, according to an embodiment. The method 450 may be used in conjunction with embodiments described with respect to one or more of FIGS. 2, 3 and 4A-4D, for example. In an embodiment, the method 450 is executed in conjunction with a packet processing system, such as in the network device 100 of FIG. 1. For ease of explanation, the method 450 is described with respect to FIGS. 2, 3 and 4A-4D, although in other embodiments, the method 450 may be executed in conjunction with other suitable devices.

At block 452, during a single clock cycle of a memory device or a system including the memory device, at least two requests to perform respective memory operations on a memory bank (e.g., a "target" memory bank) are received, in an embodiment. In an embodiment, the target memory bank is one memory bank in a first set of memory banks to store content data that is of interest to one or more clients. For example, the content data includes a shared data table used by a switch core to process a packet, in an embodiment. In an embodiment, the at least two requests are received (block 452) at a memory controller of a shared memory device, such as the memory device 200, the memory device 250, and/or the memory device 300, in an embodiment. The at least two requests are received (block 452) from two different clients. In an embodiment, the at least two requests are received from at least a first packet processing core and a second packet processing core of a multi-core network device. In another embodiment, the at least two requests are received from a first pipeline stage and a second pipeline stage of a packet processor. In another embodiment, the at least two requests are received from first and second circuits.

At block 455, direct access to the target memory bank is granted or allowed for a first request of the at least two requests, in an embodiment. For example, a memory controller such as the controller 208 or the controller 258 determines that one of the requests is to be allowed (e.g., based on priority information, an order of arrival of the requests, or some other suitable criteria), and grants or allows the determined request. As such, at block 458, content data stored in the target memory bank is directly accessed in response to the first request. For example, the memory controller directly accesses the target memory bank on behalf of the granted first request. At block 460, a respective memory operation corresponding to the granted first request is performed. For example, the memory controller performs the memory operation corresponding to the granted first request using the data obtained at block 458, in an embodiment.

At block 462, direct access to the target memory bank is denied or blocked for other requests received at the block 452, in an embodiment. For example, a memory controller such as the controller 208 or the controller 258 determines that other requests are to be blocked or denied, as the target memory bank is configured to accept only one direct access memory operation per clock cycle. As such, the memory controller blocks direct access to the target memory bank for other requests.

At block 465, in response to determining that one or more of the at least two requests is denied or blocked (block 462), redundancy data corresponding to content data in the target memory block is obtained. For example, the redundancy data corresponding to the content data in the target memory block is directly accessed from an additional memory block storing redundancy data. In an embodiment, the redundancy data stored in the additional memory block is not merely a copy of content data stored in the target memory block, but rather is different than the corresponding content data and is suitable for reconstructing the content data in the target memory block using error correction techniques, when access is blocked. For example, the redundancy data corresponds to a result of an error correction code calculation (e.g., a parity calculation) performed on at least content data in the target memory bank, in an embodiment. In a particular instance, the redundancy data corresponds to a bit-wise XOR function applied to content data stored in at least a subset of the first set of memory banks, the subset including the target memory bank.

In some embodiments, block 465 includes obtaining content data stored in one or more memory banks of the first set of memory banks other than the target memory bank. For example, the memory controller (e.g., controller 308 or 358) directly accesses one or more memory banks of the first set of memory banks other than the target memory bank to obtain content data, in an embodiment.

At block 468, content data stored in the target memory bank is reconstructed without directly accessing the target memory bank. For example, content data stored in the target memory bank is reconstructed by using the redundancy data obtained at the block 465. In an embodiment, content data stored in the target memory bank is reconstructed additionally by using the content data stored in memory banks in the first set of memory banks other than the target memory bank. In an embodiment, block 468 comprises performing an error correction code calculation on the redundancy data and content data stored in the one or more memory banks other than the target memory bank. Examples of such reconstruction were previously discussed with respect to FIGS. 2 and 3, and other suitable techniques for reconstruction are utilized in other embodiments. At block 470, a respective memory operation corresponding to the denied request (block 462) is performed using the content data reconstructed at the block 468.

Figure 6:
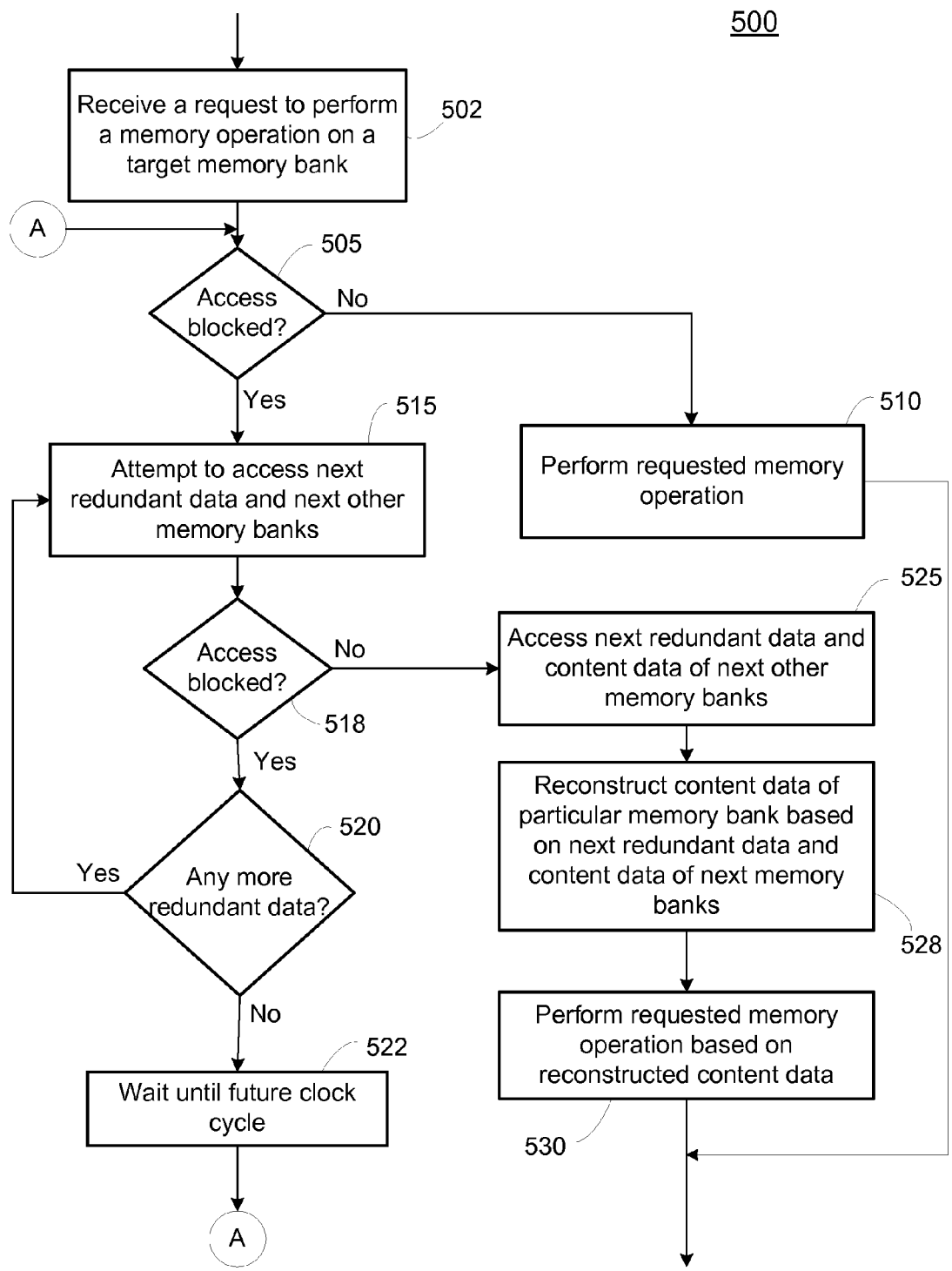
FIG. 6 is embodiment flow diagram of another example method of performing memory operations in a shared access memory device having a set of memory banks to store content data.

FIG. 6 is flow diagram of an example method 500 of providing shared access to a memory device, according to an embodiment. The method 500 may be used in conjunction with embodiments described with respect to one or more of FIGS. 3, 4A-4D and 5, for example. In an embodiment, the method 500 is utilized in a packet processing system, such as the network device 100 of FIG. 1. For ease of explanation, the method 500 is described with respect to FIGS. 3, 4A-4D and 5, although the method 500 may operate in conjunction with other suitable devices and methods.

At block 502, a request to perform a memory operation on a particular initial memory bank (e.g., a "target" memory bank) is received. For example, a client sends a request to a memory controller to read at least a portion of the contents stored in the target memory bank, in an embodiment. In an embodiment, the target memory bank is one memory bank in a first set of memory banks to store content data.

At block 505, it is determined whether access to the target memory bank is blocked. For example, if the target memory bank is presently being accessed on behalf of another client, access may be blocked, in an embodiment. If it determined that access to the target memory bank is not blocked, at block 510, a memory operation corresponding to the target memory bank is performed.

If, however, it is determined at the block 505 that the target memory bank is blocked, the flow proceeds to block 515. At block 515, access of redundancy data corresponding to the target memory bank and access of a subset of other memory banks in the set of memory banks is attempted. At block 518, it is determined whether access to the redundancy data and/or any of the subset of other memory banks are blocked (e.g., as a result of another client's request). If any of the redundancy data and/or any of the subset of other memory banks are determined to be blocked from direct access at block 518, then the flow proceeds to block 520. At block 520, it is determined whether there are further redundancy data and a further subset of memory banks in the set of initial memory banks. If it is determined that there are further redundancy data and a further subset of memory banks, the flow returns to block 515.

On the other hand, at block 520, if it is determined that no further redundancy data is available for access for re-constructing contents of the target memory bank, access of the target memory bank is delayed until a subsequent or future clock cycle at block 522. For example, during a future clock cycle, in an embodiment, access to the target memory bank is re-attempted, e.g., the method 500 returns to the block 505.

If, at block 518, a redundancy data and memory banks in the subset of memory banks are determined to be accessible, the flow proceeds to block 525, At block 525, redundancy data and content data in the subset of memory banks is accessed. At block 528, content data stored in the target memory bank is reconstructed based on the redundancy data and content data stored in the subset of memory banks. For example, an error correction code calculation is performed on redundancy data and content data accessed from the subset of memory banks to determine content data stored in the target memory bank. In one embodiment, the error correction code calculation is a parity calculation, such as a bitwise exclusive-or function or operation. Thus, content data stored in the target memory bank is reconstructed without directly accessing the target memory bank.

At block 530, a memory operation indicated by the request received at block 502 is performed using the content data reconstructed at the block 528.

As just one example involving the method 500, referring to FIG. 3, when a target memory bank (e.g., MB (1,1)) is blocked (as determined at the block 505), a column-based reconstruction is attempted (e.g., on the contents of column 1, excluding MB (1,1), as indicated by block 515. If any of the memory banks used in the column-based reconstruction is blocked, a row-based reconstruction is attempted (e.g., on the contents of row 1, excluding MB (1,1) is attempted. If any of the memory banks used in the row-based reconstruction is blocked, an array-based reconstruction is attempted (e.g., on the contents of the (n+1)×(m+1) array of FIG. 3, excluding row 1 and column 1). If any of the memory banks used in the array-based reconstruction is blocked, the method 500 proceeds to block 522 to wait until a future clock cycle. Otherwise, the contents of the target memory bank are reconstructed (e.g., as denoted by block 528) based on a successful access at the block 525.

At least some of the various blocks, operations, and techniques described above may be implemented in hardware, a processor or computer executing firmware and/or software instructions, or any combination thereof. When implemented at least partially by utilizing a processor executing software or firmware instructions, the executable software or firmware instructions may be stored in any non-transitory, tangible, computer readable or machine readable memory such as on a magnetic disk, an optical disk, or other tangible storage medium, in a RAM or ROM or flash memory, processor, hard disk drive, optical disk drive, tape drive, etc. The software or firmware instructions may include computer readable or machine readable instructions stored on a non-transitory, tangible memory of another one or more computer readable or machine readable storage medium that, when executed by the processor, cause the processor to perform various acts. When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method of performing memory operations in a memory device having a set of memory banks to store content data, comprising:
receiving, during a single clock cycle, at least two requests to perform respective memory operations in a first memory bank in the set of memory banks;
determining that one or more of the at least two requests is blocked from accessing the first memory bank;
in response to determining that the one or more of the at least two requests is blocked from accessing the first memory bank:
accessing redundancy data associated with the first memory bank and different from content data stored in the first memory bank, and
reconstructing, without accessing the first memory bank, at least a portion of the content data stored in the first memory bank based on the redundancy data associated with the first memory bank;
performing a first requested memory operation using the content data stored in the first memory bank; and
performing a second requested memory operation using content data reconstructed 1) without accessing the first memory bank and ii) based on the redundancy data associated with the first memory bank.

2. The method of claim 1, wherein:
the set of memory banks is a first set of memory banks,
accessing the redundancy data associated with the first memory bank comprises accessing redundancy data stored in at least one second memory bank in a second set of one or more memory banks,
the at least one second memory bank corresponds to the first memory bank, and
the second set of one or more memory banks is to store storing redundancy data associated with content data stored in the first set of memory banks.

3. The method of claim 2, wherein reconstructing the at least the portion of the content data stored in the first memory bank based on the redundancy data associated with the first memory bank comprises reconstructing content data stored in a particular address of the first memory bank based on redundancy data stored in a corresponding particular address of the at least one second memory bank.

4. The method of claim 2, wherein reconstructing the at least the portion of the data stored the first memory bank based on the redundancy data comprises:
reconstructing the at least the portion of the data stored the first memory bank based on the redundancy data stored in the at least one second memory bank and further based on content data stored in a subset of the first set of memory banks, the subset of the first set of memory banks excluding the first memory bank.

5. The method of claim 1, wherein the redundancy data is first redundancy data, and the method further comprises:
(a) determining that the one or more of the at least two requests is blocked from accessing the first redundancy data, and, based on the determination that the one or more of the at least two requests is blocked from accessing the first redundancy data, forgoing reconstructing the at least the portion of the content data stored in the first memory bank based on the first redundancy data;
(b) determining whether the one or more of the at least two requests is blocked from accessing next redundancy data;
(c) when the one or more of the at least two requests is not blocked from accessing the next redundancy data, reconstructing, without accessing the first memory bank, the at least the portion of the data stored in the first memory bank based on the next redundancy data;
(d) when the one or more of the at least two requests is blocked from accessing the next redundancy data, one of:
attempting to access the first memory bank during a clock cycle that occurs after the single clock cycle; or
repeating steps (b) through (d) for additional redundancy data.

6. The method of claim 1, wherein reconstructing the at least the portion of the data stored in the first memory bank based on the redundancy data comprises reconstructing the at least the portion of the data stored in the first memory bank based on data corresponding to a parity calculation.

7. A memory device comprising:
a set of memory banks to store content data, the set of memory banks including a first memory bank; and
a memory controller configured to:
when at least two requests to perform respective memory operations the first memory bank are received during a single clock cycle, determine that one or more of the at least two requests is blocked from accessing the first memory bank;
in response to determining that the one or more of the at least two requests is blocked from accessing the first memory bank:
access redundancy data associated with the first memory bank, the redundancy data associated with the first memory bank being different from content data stored in the first memory bank, and
reconstruct, without accessing the first memory bank, at least a portion of the content data stored in the first memory bank based on the redundancy data associated with the first memory bank;
perform a first requested memory operation based on the content data stored in the first memory bank; and
perform a second requested memory operation based on content data reconstructed i) without accessing the first memory bank, and ii) based on the redundancy data associated with the first memory bank.

8. The memory device of claim 7, wherein:
the set of memory banks is a first set of memory banks,
the memory device further comprises a second set of memory banks to store redundancy data associated with content data stored in the first set of memory banks, and the redundancy data associated with the first memory bank is stored in at least one second memory bank included in the second set of memory banks.

9. The memory device of claim 8, wherein the first set of memory banks are arranged in an array, and the second set of memory banks are included in at least one of an additional column of the array or an additional row of the array.

10. The memory device of claim 8, wherein the memory controller is configured to reconstruct content data stored in a particular address of the first memory bank based on redundancy data stored in a corresponding particular address of the at least one second memory bank.

11. The memory device of claim 7, wherein the memory controller is configured to reconstruct the at least the portion of the content data stored in the first memory bank based on the redundancy data associated with the first memory bank and further based on content data stored in a subset of the set of memory banks, the subset of the set of memory banks excluding the first memory bank.

12. The memory device of claim 7, wherein the redundancy data corresponds to a error correction operation.

13. The memory device of claim 7, wherein the redundancy data is first redundancy data, and wherein the memory controller is further configured to:
   (a) determine that the one or more of the at least two requests is blocked from accessing the first redundancy data, and based on the determination that the one or more of the at least two requests is blocked from accessing the first redundancy data, forgo reconstructing the at least the portion of the content data stored in the first memory bank based on the first redundancy data;
   (b) determine whether the one or more of the at least two requests is blocked from accessing next redundancy data;
   (c) when the one or more of the at least two requests is not blocked from accessing the next redundancy data, reconstruct, without accessing the first memory bank, the at least the portion of the data stored in the first memory bank based on the next redundancy data;
   (d) when the one or more of the at least two requests is blocked from accessing the next redundancy data, one of:
      attempt to access the first memory bank during a clock cycle that occurs after the single clock cycle; or
      repeat steps (b) through (d) for additional redundancy data.

14. A network device comprising the memory device of claim 7.

15. A network device, comprising:
   a set of memory banks to store content data;
   a switching core configured to access the set of memory banks and to perform a packet processing operation based on content data stored in the set of memory banks; and
   a memory controller configured to:
      receive, from the switching core, a request to perform a memory operation in a first memory bank, the first memory bank included in the set of memory banks;
      determine that at least a portion of the switching core is blocked from accessing the first memory bank;
      in response to the determination that the at least the portion of the switching core is blocked from accessing the first memory bank:
         access redundancy data associated with the first memory bank, the redundancy data being different from content data stored in the first memory bank, and
         reconstruct, without accessing the first memory bank, at least a portion of the content data stored in the first memory bank based on the redundancy data associated with the first memory bank; and
      perform the requested memory operation using content data reconstructed i) without accessing the first memory bank, and ii) based on the redundancy data associated with the first memory bank.

16. The network device of claim 15, wherein the content data stored in the set of memory banks comprises a shared control table.

17. The network device of claim 15, wherein the at least the portion of the switching core is a first portion of a first switching core, and wherein the first portion of the first switching core is blocked from accessing the first memory bank by at least one of: a second portion of the first switching core, or a second switching core included on the network device.

18. The network device of claim 15, wherein the redundancy data corresponds to a parity calculation.

19. The network device of claim 15, wherein:
   the set of memory banks is a first set of memory banks,
   the network device further comprises a second set of memory banks to store redundancy data associated with the content data stored in the first set of memory banks, and
   the redundancy data associated with the first memory bank is stored in at least one second memory bank included in the second set of memory banks, the at least one second memory bank corresponding to the first memory bank.

20. The network device of claim 15, wherein the redundancy data is first redundancy data, and wherein the memory controller is further configured to:
   (a) determine that the at least the portion of the switching core is blocked from accessing the first redundancy data, and based on the determination that the at least the portion of the switching core is blocked from accessing the first redundancy data, forgo reconstructing the at least the portion of the content data stored in the first memory bank based on the first redundancy data;
   (b) determine whether the at least the portion of the switching core is blocked from accessing next redundancy data;
   (c) when the at least the portion of the switching core is not blocked from accessing the next redundancy data, reconstruct, without accessing the first memory bank, the at least the portion of the content data stored in the first memory bank based on the next redundancy data;
   (d) when the at least the portion of the switching core is blocked from accessing the next redundancy data, one of:
      attempt to access the first memory bank during a future clock cycle; or
      repeat steps (b) through (d) for additional redundancy data.

* * * * *